Figure 1:
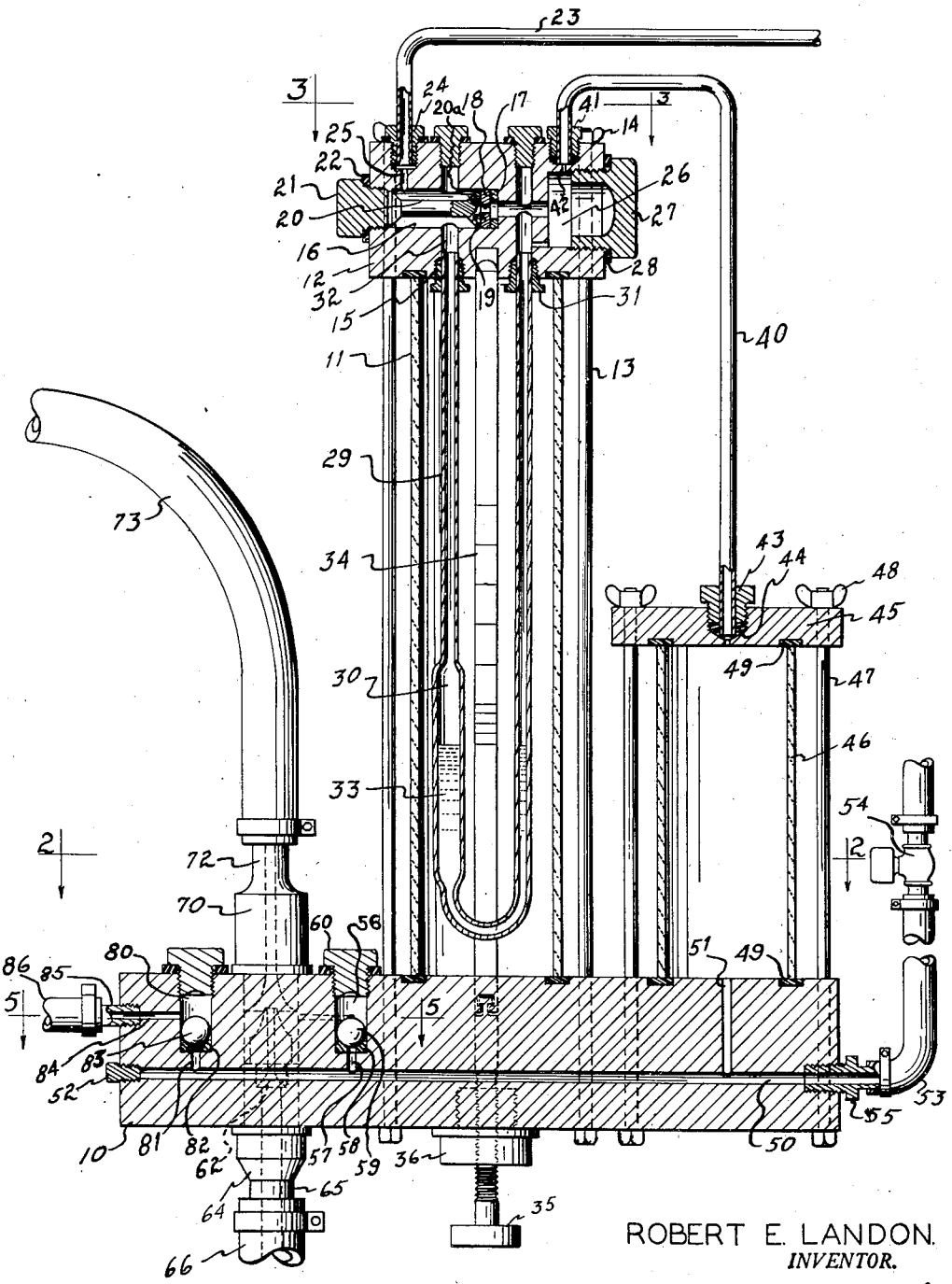

April 26, 1949.  R. E. LANDON  2,468,561
LIQUID TREATING DEVICE
Filed Feb. 18, 1946  2 Sheets-Sheet 1

ROBERT E. LANDON.
INVENTOR.
BY Schley & Schley
ATTORNEYS.

April 26, 1949. R. E. LANDON 2,468,561
LIQUID TREATING DEVICE
Filed Feb. 18, 1946 2 Sheets-Sheet 2

ROBERT E. LANDON
INVENTOR.

BY Schley & Schley
ATTORNEYS

Patented Apr. 26, 1949

2,468,561

UNITED STATES PATENT OFFICE 2,468,561

LIQUID TREATING DEVICE

Robert E. Landon, Dallas, Tex.

Application February 18, 1946, Serial No. 648,495

5 Claims. (Cl. 210—28)

This invention relates to new and useful improvements in liquid treating devices.

During the past several years, various types of apparatus have been used for injecting or admixing chlorine or chlorine containing substances in water, waste disposal lines, cooling systems and the like for the purpose of killing bacteria or otherwise disinfecting the same. Such devices have generally required the use of float boxes, float valves and make-up water wherein the chlorine or chlorine containing chemicals have been mixed with or added to water prior to actual use in the main lines. The mixing systems used in these types of apparatus, or chlorinators, require constant care, adjustment and repair of the float valve mechanisms, which corrode, rust and fail to function, causing frequent overflow of water or escaping of chlorine from the device. Further, such devices are likely to permit water or moisture to back up into the machine and the chlorine gas lines and container during period of non-use.

It is, therefore, one object of this invention to provide an improved liquid treating device for injecting or admixing treating chemicals, such as gaseous chlorine, into water lines, waste disposal lines, chemical carrying lines, or the like.

An important object of the invention is to provide an improved treater of the character described which utilizes a vacuum mixing system for automatically controlling the admixture or injection of the treating chemical with the material to be treated, whereby the use of float valves, float boxes and the like is eliminated.

Another object of the invention is to provide an improved treater, or chlorinator, having a continuous indicating measuring apparatus for accurately and uniformly measuring the quantity of treating chemical, or chlorine, delivered by the device to the water or other matter being treated.

A further object of the invention is to provide, in a device of the character described, means for preventing back-flow of the treated matter into the treating chemical lines or into the measuring apparatus.

Still another object of the invention is to provide a simple positive control for the admission of the treating chemical or chlorine to the water or other matter to be treated, such control being readily changeable to provide for a wide range of operating conditions varying from very small quantities of the treating chemical to large quantities.

A particular object of the invention is to provide an improved treater, or chlorinator, wherein the treating chemical, or chlorine, is conveyed through the apparatus by vacuum means, rather than being forced under internal pressure greater than atmospheric, whereby it is impossible for the chlorine or treating chemical to escape from the device at loose fittings or connections because of internal pressure within the apparatus.

A still further object of the invention is to provide a device of the character described which is simple to operate, compact and readily portable and economical to construct.

A construction designed to carry out the invention will be hereinafter described together with other features of the invention.

Figure 2:
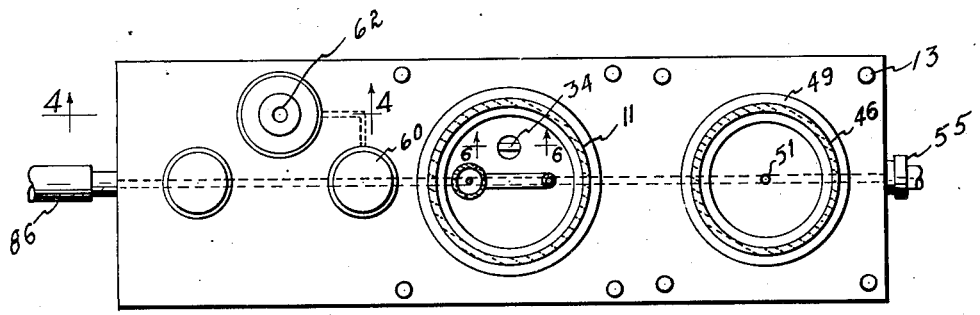
Figure 4:
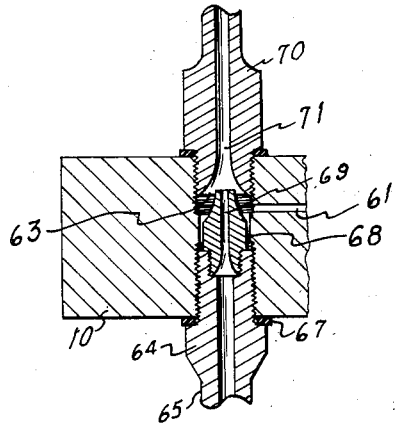
Figure 3:
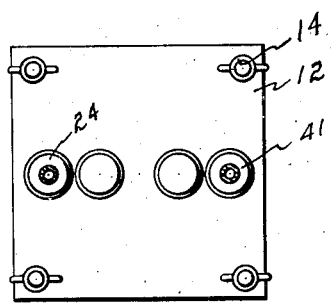
Figure 6:
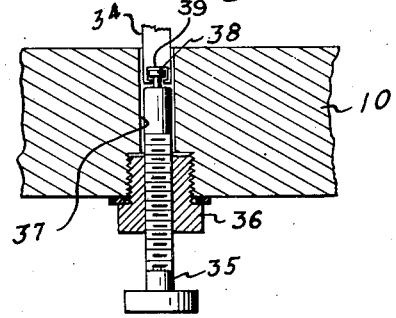
Figure 5:
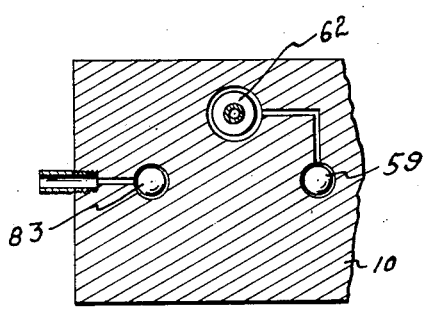

The invention will be more readily understood from a reading of the following specification and by reference to the accompanying drawings, wherein an example of the invention is shown, and wherein:

Fig. 1 is a view, partly in elevation and partly in section, of a device constructed in accordance with the invention, Fig. 2 is a horizontal cross-sectional view taken on the line 2—2 of Fig. 1, showing the base member of the device, Fig. 3 is a horizontal cross-sectional view taken on the line 3—3 of Fig. 1, showing the head member or block, Fig. 4 is a fragmentary, transverse, vertical, sectional view of the vacuum pump or injector, Fig. 5 is a fragmentary, horizontal, cross-sectional view of the base member taken on the line 5—5 of Fig. 1, showing a portion of the treating chemical conduits, and Fig. 6 is a fragmentary, transverse, vertical sectional view of the indicating scale adjusting assembly.

In the drawings, the numeral 10 designates a base member or block, which may be substantially rectangular in shape and may be formed of suitable corrosion resistant material, such as silver, hard rubber, plastic, or the like. An upright cylindrical gage housing or support 11 is mounted substantially centrally of the base member and a head member 12 is secured on the upper end of said housing. The head member is substantially square and may also be formed of suitable corrosion resistant material similar to that of the base member. Elongate tie bolts 13 extend through both the base block and the head member and are provided with wing nuts 14 whereby the head member and gage cylinder may be securely clamped to the base block. Suitable packing gaskets 15 are interposed between the ends of the gage cylinder and the base block and head member to provide a fluid tight seal therebetween.

The head member 12 is provided with a central transverse fluid passage 16 which is reduced in diameter at its mid-portion whereby a shoulder or seat 17 is formed facing toward the left-hand portion of the fluid passage. An annular packing gasket 18 is confined between the seat 17 and an orifice plate 19 having a central restricted flow orifice therein. This orifice plate is preferably formed of silver or other corrosion resistant material. For securing the orifice in operative position in the fluid passage, an elongate spool member 20 is mounted in said passage between the orifice plate and a cap screw 21 threaded into the end of the fluid passage. The cap screw presses the spool against the orifice plate to hold said plate and the annular gasket 18 securely against the shoulder 17 in the head member. Fluid courses 20a are provided in the flange of the spool adjacent the orifice plate to permit flow from the fluid passage to the orifice of the plate. A packing gasket 22 is interposed between the head of the cap screw and the head member 12 to prevent fluid leakage therebetween.

A treating fluid conductor 23 has one end secured in a fluid-tight connection by means of a packing gland 24 within a vertical flow passage 25 formed in the head member and communicating with the left-hand portion of the fluid passage 16. The other end of the conductor 23 is connected with a source of treating fluid, including a control valve and container (not shown), whereby the treating fluid is introduced through the conductor into the fluid passage 16 of the head member. Ordinarily, the treating fluid will be chlorine which is liquefied under pressure in the container (not shown) and which is permitted to escape and expand to gaseous form at the control valve. However, it is within the scope of the invention to utilize any other suitable treating fluid in the device.

The right-hand portion of the fluid passage 16 is considerably enlarged to form a reservoir 26 which is closed by a cap member 27 threaded into the open end of the passage. A packing gasket 28 prevents leakage between the cap member 27 and the head member 12.

An elongate upright U-shaped manometer tube 29 having an enlarged reservoir chamber 30 in its upstream arm has its ends secured by packing glands 31 in ports 32 formed in the underside of the head member 12 and communicating with the fluid passage 16 on opposite sides of the orifice plate 19, whereby differences in fluid pressure will be indicated in the customary manner by the fluid 33 in said manometer tube. The manometer fluid is preferably of a heavy non-vaporizing matter, such as mercury or the like.

An elongate indicating scale 34 positioned between the upright arms of the manometer tube is longitudinally adjustable with respect to the tube to permit correctly setting the scale with regard to the fluid 33 in the tube. Adjustment of the scale is obtained by means of an elongate adjusting screw 35 threaded through a packing gland 36 mounted in a vertical opening 37 formed in the base member in alinement with the scale. As shown in Fig. 6, the upper end of the adjusting screw has an axial head 38 which is arranged to engage in a substantially T-shaped transverse slot 39 formed in the lower end of the scale 34, whereby longitudinal adjustment of the screw causes corresponding longitudinal movement of the scale. The upper end of the scale slides in an opening formed in the underside of the head member 12, whereby the scale is maintained in vertical position. Both the manometer tube and the scale are enclosed within the gage housing 11, which is preferably made of glass or other suitable material to permit reading the heights of the columns of manometer fluid with respect to the scale. It is preferable that the marking of the scale be such that it will indicate directly the number of pounds of treating fluid flowing through the orifice and head member each twenty-four hours, but any other suitable or desirable marking may be used.

A tubular gas conductor 40 has one end secured by a packing gland 41 in a port 42 in the head member 12 communicating with the reservoir 26 at the right-hand end of the fluid passage 16, and has its other end connected by a packing gland 43 with a central port 44 in a closure head 45 at the upper end of a gas cylinder 46 mounted on the base block 10 near its right-hand end. Elongate tie bolts 47 extend through both the base block and the closure head exteriorly of the cylinder and are provided with wing nuts 48, whereby the closure head and gas cylinder are securely fastened to the base block. Packing rings 49 are positioned between the ends of the gas cylinder and the base block and closure head to provide a fluid-tight seal between said members.

A horizontal flow passage 50 extends longitudinally from end to end of the base block 10, and a vertical port 51 provides communication between said horizontal flow passage and the interior of the gas cylinder 46, whereby treating fluid may flow from the fluid passage 16 of the head member through the gas cylinder to the horizontal flow passage 50 of the base block. The left-hand end of the flow passage is closed by a plug 52, and a conduit 53 having a valve 54 connected therein is connected by means of a bushing 55 to the right-hand end of said flow passage, for a purpose which will be hereinafter described.

A vertical valve chamber 56 formed in the base block has a reduced axial opening 57 communicating with the horizontal flow passage 50, and a replaceable valve seat 58 upon which a check ball 59 seats is positioned in the lower end of the housing surrounding the axial opening 57 for preventing back-flow from the chamber to the horizontal flow passage. The upper end of the chamber is closed by a plug 60 threaded thereinto and having a sealing gasket for preventing fluid leakage out of the chamber.

A fluid jet vacuum pump 62 is mounted in a vertical opening 63 extending through the base block to one side of the horizontal flow passage 50, as is clearly shown in Figs. 2 and 4, and a lateral flow port 61 provides for fluid flow from the valve chamber 56 to said opening 63. The jet pump includes a jet housing 64 which is screw-threaded into the lower end of the opening and has a reduced depending shank 65 to which a liquid supply tube 66 is connected. A gasket 67 is interposed between the housing and base block to prevent fluid leakage therebetween. An interchangeable injector tip or nozzle 68 having a reduced axial flow opening 69 is screw-threaded into the upper end of the jet housing for creating a high velocity jet of fluid from the housing. A jet discharge housing 70 is screw-threaded into the upper end of the vertical opening 63 and is spaced vertically from the jet housing 64. The discharge housing is provided with a Venturi-like axial bore 71 flared at its lower end and into which the jet from the tip or nozzle is directed. A packing gasket 67 surrounding the discharge housing prevents fluid leakage between said housing and the base block.

The lateral flow port 61 communicates with the bore of the opening 63 between the jet housing and the discharge housing, whereby the vacuum created by the jet pump will create a suction in said opening and the lateral port will draw treating fluid from within the horizontal flow passage 50 through the valve chamber 56 and the lateral port 61 to the bore 71 of the discharge housing. The treating fluid is thus mixed or injected into the liquid stream passing through the jet pump.

The upper end of the discharge housing 70 is reduced to form a neck 72 to which a discharge tube 73 is connected. The discharge tube is connected at its other end to a water line, waste disposal line, chemical line, or the like (not shown) for directing the treating fluid into such lines, whereby bacteria, mold, algae or the like in said lines are killed, eliminated or purified. Suitable valves (not shown) may be connected in the discharge tube to prevent the matter in the main line (not shown) from flowing back up said discharge tube to the pump and base member. Also, suitable cut-off valves (not shown) may be connected in the supply tube 66 to prevent liquid from flowing therefrom into the base member when the device is not in operation. Of course, the ball check valve 59 will normally prevent such backflow into the base member, but the aforementioned valves (not shown) are desirable.

A second vertical valve chamber 80 is formed in the base block 10 near the left-hand end thereof and this chamber has communication with the horizontal flow passage 50 by means of a small vertical port 81 extending axially downward from said chamber. A replaceable valve seat 82 is positioned at the lower end of the chamber surrounding the axial port, and a ball check valve 83 is adapted to engage said seat to prevent back-flow from the chamber to the horizontal flow passage. A lateral exhaust vent 84 extends outwardly from the chamber and a bushing, 85 having a vent tube 86 connected thereto, is screw-threaded into said exhaust vent. This assembly provides for automatic venting of the treating fluid or chemical from the horizontal flow passage 50 should such fluid be prevented from passing through the valve chamber 56 and jet pump 62 for any reason.

Suitable strainers or filters (not shown) may be installed in the various fluid supply lines to prevent foreign matter from entering the orifices or jet openings and interfering with the proper functioning of those elements. Also, if desired, the entire assembly may be enclosed in a suitable case or cabinet (not shown) whereby it is protected against tampering and is made readily portable.

In operation, the chlorine or other treating chemical is permitted to flow as a gas through the conductor 23 to the fluid passage 16 in the head member 12. The gas then flows through the orifice in the orifice plate 19 to the reservoir 26. Since the gas passes through a restrictive orifice in the plate, the pressure on the downstream or reservoir side of the orifice plate will be lower than the pressure on the upstream or spool side of the plate. Therefore, the liquid in the manometer tube will be forced downwardly in the left-hand arm of the tube and will rise in the right-hand arm. Care should be taken in starting the flow of the gas, since a rather violent reaction in the head member may cause the manometer fluid to flow completely out of the right-hand arm. In such case, however, the manometer fluid will be trapped in the reservoir 26 and will not enter the conductor 40 or the gas cylinder 46.

The gas will continue to flow from the reservoir 26 through the conductor 40 to the gas cylinder 46, and from said cylinder through the port 51 to the horizontal flow passage 50 of the base block. If the jet vacuum pump 62 is not in operation, the gas may escape through the vent check valve 83 to the exhaust vent 84 and vent tube 86 through which it may be led a safe distance from the assembly.

The flow of gas through the device is set to produce the desired number of pounds of gas or treating chemical per twenty-four hours by adjusting the treating fluid control valve (not shown) at the container, and reading the amount being permitted to flow directly from the manometer scale 34, which is empirically marked to give such a direct reading.

The valve (not shown) in the fluid supply tube 66 is then opened to permit water or other liquid to flow through the jet vacuum pump 62, thereby creating a vacuum in the opening 63 in the customary manner of such vacuum pumps. The water or other liquid will flow out the discharge tube 73 to the main water line (not shown) or other point of application of treating fluid.

The vacuum created in the opening 63 by the jet pump will draw treating chemical or gas from the horizontal flow passage 50 in the base member through the valve chamber 56 and the lateral port 61 to the opening 63, where such gas or treating fluid is admixed with the pumping liquid and carried through the discharge tube to the point of application. The fine stream and turbulence of the pumping liquid at the point of admixture with the treating chemical or gas provides for more ready mixture of such treating fluid with the liquid.

The suction of the vacuum causes the vent check valve 83 to remain closed, whereby all the treating gas is drawn into the jet pump. Should the jet pump fail, however, or for any reason the pressure within the horizontal flow passage rises sufficiently, the vent check valve will open to permit the chlorine or other treating fluid to be exhausted to atmosphere at a distance from the device.

Also, should it be desired to "break" the vacuum in the base member flow passages for any reason, or to clean out or otherwise open the same, the valve 54 in the conduit 53 may be opened to permit atmospheric pressure to enter said passages, or to permit cleaning fluid to be flowed thereinto, if desired. This conduit may also serve as a drain line for the base member passages, should liquid accumulate therein.

The vacuum produced by the jet pump acts on the gas or other fluid in the horizontal flow passage 50, the gas cylinder 46, the conductor 40 and the reservoir 26. Thus, one side of the orifice plate 19 actually has a pressure less than atmospheric acting thereon. Furthermore, since the entire system from the orifice plate to the jet pump is operating under a vacuum, it will readily be seen that it is relatively impossible for the chlorine gas or other treating chemical to escape from the system, as it might were it traveling through the system under pressure greater than atmospheric.

Obviously, should it be desired to increase or decrease the maximum or minimum amounts of treating fluid passing through the apparatus, such result may be obtained by exchanging the orifice plate 19 for one with a larger or smaller orifice. In such case, a manometer scale calibrated for use with the particular orifice size may also be exchanged for the scale previously in use. Further, by exchanging the injector jet or nozzle 68 for one with a different bore, and similarly changing the discharge housing, the amount of vacuum created by the jet vacuum pump may be altered to meet varying conditions of pressure, volume of flow, etc.

From the foregoing, it will be seen that an improved treating device or chlorinator has been provided in which the control of the admission of the treating fluid is positively controlled or effected by means of the orifice plate 19, and that only gas is permitted to enter or pass through the controlling passage. Thus, float valves, float boxes and the like with their attendant disadvantages are eliminated. It will further be seen that the gas is admixed with the liquid or water at the jet pump, whereby more ready mixture takes place due to the conditions of turbulence and fine stream prevailing at the pump. Also, water or other liquid is prevented from backing up into the treating gas passages, the orifice control fluid passage, and the container.

It will also be seen that a positive direct reading measuring apparatus has been provided for indicating the amount of treating fluid in pounds per twenty-four hours is being injected by the device. It is, therefore, possible to accurately gage the amount of treating fluid injected or delivered by the device.

Furthermore, by conveying the treating fluid or chlorine gas through the device by means of vacuum draft, the escape of the gas or fluid from the system is prevented.

Also, it will be seen that a great degree of flexibility is provided for, since the size of the orifices in the orifice plates may be changed to permit greater maximum or lesser minimum flow of treating fluid through the apparatus, while at all times a positive control over such flow is maintained. The same degree of flexibility is provided for in the jet vacuum pump, since the size of the bore of the jet injector or nozzle and the discharge housing may be altered by exchanging such members to meet varying conditions of pressure, fluid flow, etc.

Since there are no float valves or float boxes, or no make-up water provided for in this device, it is extremely simple in operation, substantially trouble-free, economical to operate and may be so compactly made as to be readily portable.

What I claim and desire to secure by Letters Patent is:

1. A liquid treating device including, a base member having a mixing chamber therein, a liquid conductor communicating with said chamber for conducting a liquid thereto, an eduction tube for conducting fluids from the chamber, a head member supported by said base member and having a fluid passage therethrough, a conduit for conveying treating fluid from a source to the fluid passage of the head member, a portion of said fluid passage being enlarged, a flow restrictive element in the enlarged portion of said fluid passage, a removable retaining element for confining the flow restrictive element in the enlarged portion of said fluid passage, a flow conductor communicating with the flow passage of the head member and with the mixing chamber of the base member, and a vacuum pump in the mixing chamber for causing the treating fluid to flow from the fluid passage of the head member through the restrictive element to the mixing chamber in the base member, whereby controlled amounts of treating fluid are admixed with the liquid in said chamber and are flowed out of said chamber through the eduction tube.

2. A liquid treating device of the character set forth in claim 1, and a fluid accumulator chamber in the flow conductor between the fluid passage and the mixing chamber.

3. A liquid treating device of the character set forth in claim 1, and a manometer connected across the flow restrictive element.

4. A liquid treating device of the character set forth in claim 3, wherein the manometer is disposed within a fluid-tight housing extending between the base member and the head member.

5. A liquid treating device of the character set forth in claim 4, wherein the housing is formed of a transparent material.

ROBERT E. LANDON.

REFERENCES CITED

The following references are of record in the file of this patent:

UNITED STATES PATENTS

| Number | Name | Date |
|---|---|---|
| 2,096,021 | Aherne | Oct. 19, 1937 |
| 2,109,439 | Swearingen | Feb. 22, 1938 |
| 2,151,142 | Pardee | Mar. 21, 1939 |
| 2,158,985 | Peet | May 16, 1939 |
| 2,257,865 | Swearingen | Oct. 7, 1941 |
| 2,260,936 | Everson | Oct. 28, 1941 |
| 2,376,178 | Ornstein | May 15, 1945 |
| 2,423,379 | Geiser | July 1, 1947 |